Dec. 7, 1943.  A. T. GREGORY ET AL  2,336,010
SUPERCHARGER
Filed Sept. 17, 1942  3 Sheets-Sheet 1

INVENTORS
ALFRED T. GREGORY
BY EUGENE W. WASIELEWSKI
their ATTORNEYS

Dec. 7, 1943.　　A. T. GREGORY ET AL　　2,336,010
SUPERCHARGER
Filed Sept. 17, 1942　　3 Sheets-Sheet 2

INVENTORS
ALFRED T. GREGORY
BY EUGENE W. WASIELEWSKI
Hoguet, Neary & Campbell
their ATTORNEYS.

Dec. 7, 1943.  A. T. GREGORY ET AL  2,336,010
SUPERCHARGER
Filed Sept. 17, 1942    3 Sheets-Sheet 3

INVENTORS
ALFRED T. GREGORY
BY EUGENE W. WASIELEWSKI
their ATTORNEYS

Patented Dec. 7, 1943

2,336,010

UNITED STATES PATENT OFFICE 2,336,010

SUPERCHARGER

Alfred T. Gregory, Massapequa, and Eugene W. Wasielewski, Westbury, N. Y., assignors to Fairchild Engine and Airplane Corporation, Farmingdale, N. Y., a corporation of Maryland Application September 17, 1942, Serial No. 458,792

8 Claims. (Cl. 230—114)

This invention relates to superchargers and has particular reference to superchargers for internal combustion engines of the aeronautical class, although the invention is not limited to that class.

As generally arranged, superchargers for aeronautical engines are either driven directly by the engine or by an engine exhaust turbine, and their speed and consequent volumetric output is governed either manually or automatically, in accordance with the requirements of the engine. Various means are also provided for controlling the pressure rise ratio at different altitudes, including automatic regulators responsive to altitude changes for adjusting impeller speeds, as shown, for example, in Gregory Patent No. 2,187,737; arrangements including adjustable vanes in the intake for varying the directional relation between the intake fluid and that in the impeller, as shown for example in Szydlowski and Planiol Patent No. 2,210,155, and the like.

In accordance with the present invention, a simple and effective arrangement is provided for regulating the pressure rise ratio of an engine supercharger by utilizing the last-named method, i. e., altering the directional relationship between the fluid at the intake and in the impeller, but without the use of adjustable vanes in the intake.

In a preferred embodiment of the invention the supercharger is provided with two separate intake ducts, one directed in the direction of impeller rotation, as is customary, and the other directed opposite to the impeller rotation, with a dual valve selectively controlling the two intakes so that one or the other supplies the impeller, whereby the fluid entering the impeller from one duct swirls in the direction of impeller rotation and thus decreases the pressure rise ratio, whereas the fluid entering the impeller from the other duct swirls in a direction opposite to that of the impeller rotation and thus increases the pressure rise ratio. By partially opening the valve means from or in both ducts so that the oppositely swirling intake fluid currents oppose each other to a variable degree the pressure rise ratio may be infinitely varied between the two extreme conditions that are provided when either of the ducts is fully closed. The valve may be of the sleeve, butterfly, slide or any equivalent type of valve controlled manually or automatically in accordance with altitude changes, and the like.

It will be seen that the supercharger control of the present invention provides a very effective means for obtaining all variations in pressure rise ratio that are required during the most severe operating conditions of an engine, and in a simple manner requiring a minimum of operating mechanism.

For a more complete understanding of the invention, reference may be had to the accompanying drawings, in which.

Figure 1:
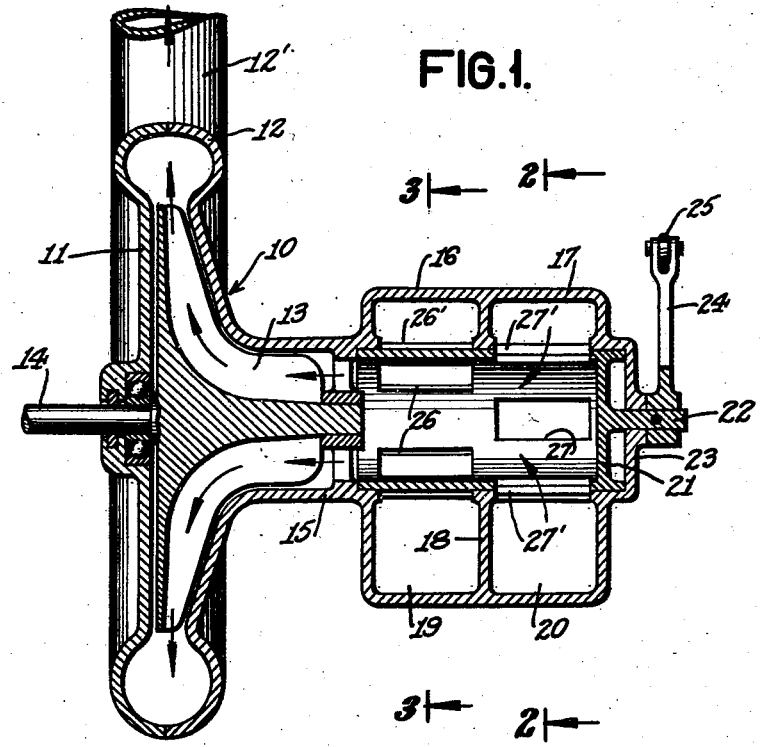
Figure 1 is an axial section of a supercharger equipped with the pressure ratio controlling means of this invention, as seen along the line 1—1 of Fig. 2.

Referring to Fig. 1 of the drawings, numeral 10 designates the supercharger, which may be of the aeronautical type, having a housing 11 provided with the usual diffuser scroll 12, discharge pipe 12' leading to the engine, and the impeller 13 of the bent blade type whose shaft 14 is driven from any suitable source of power, such as the engine, an exhaust gas turbine, or the like.

The housing 11 is preferably provided with a tubular axial extension 15 enclosed within two separate intake scrolls 16 and 17, having the common separating partition 18.

Figure 3:
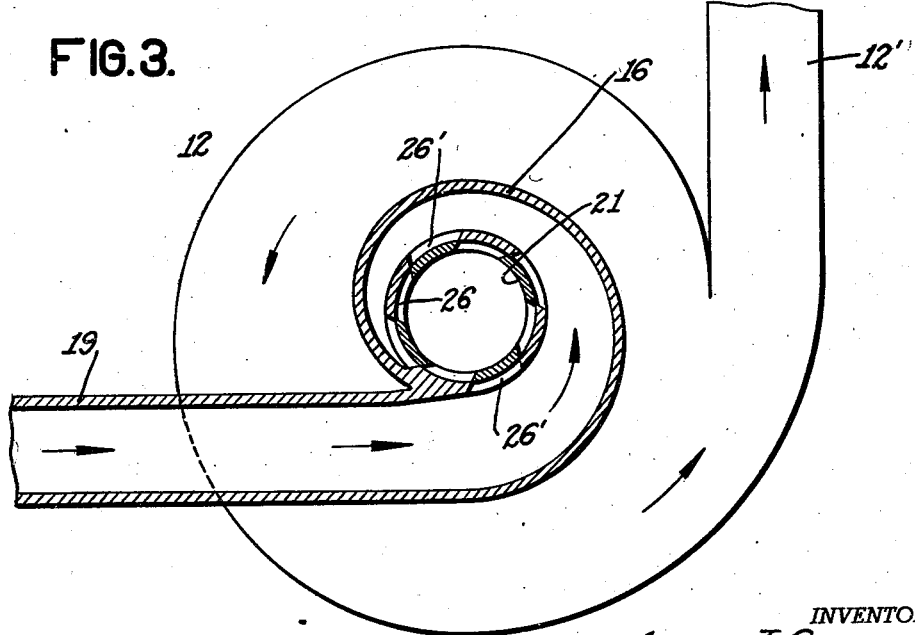
Fig. 3 is a transverse section through the other fluid intake scroll as seen along the line 3—3 of Fig. 1.

Scroll 16 is directed in the direction of the supercharger diffuser scroll 12 and hence is complementary thereto in that it imparts a swirl to the intake fluid in the same direction that the impeller 13 is driven, i. e., in a counter-clockwise direction, as seen in Fig. 3. Complementary scroll 16 is supplied by duct 19 with air, or fuel-air mixture, depending upon whether or not the fuel supply or carburetor is ahead of the supercharger, or other fluid, according to requirements.

Figure 2:
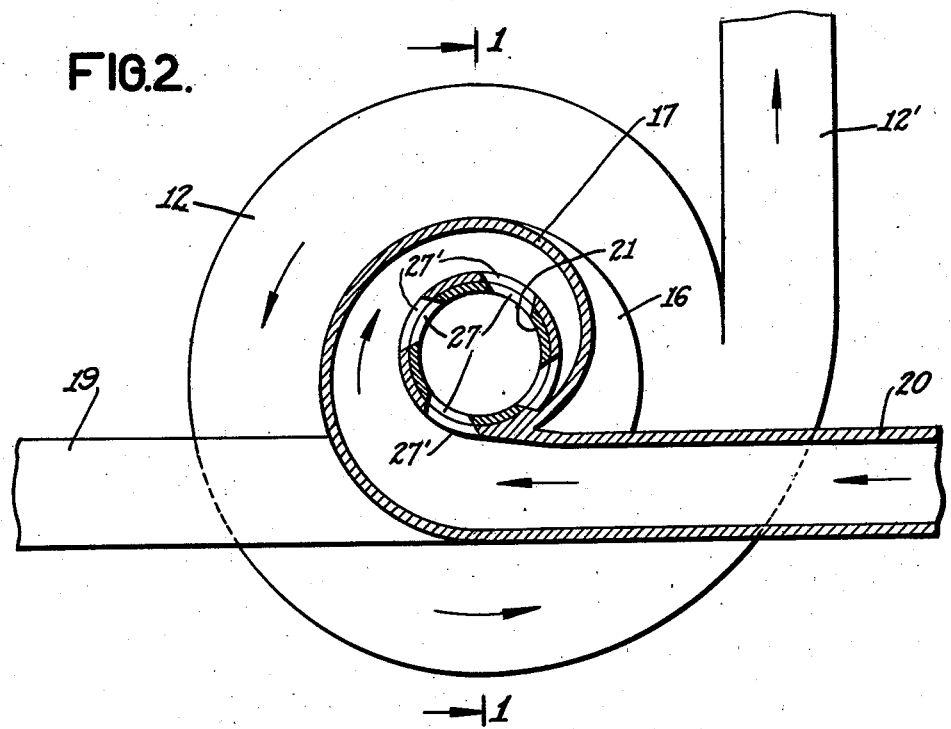
Fig. 2 is a transverse section through one of the two fluid intake scrolls, as seen along the line 2—2 of Fig. 1.

Scroll 17 is directed oppositely to supercharger diffuser scroll 12, as best shown in Fig. 2, and hence the swirl that it imparts to the intake fluid is in opposition to the direction of the impeller 13, thereby causing the impeller to exert more work on the fluid to reverse its direction before compression. Opposition scroll 17 is likewise supplied with air, combustible mixture, or other fluid by duct 20.

Journalled within supercharger casing extension 15 is a dual sleeve valve 21 having an axial stud or stub shaft 22 extending through the end wall 23 of the casing extension 15 and fitted with a crank or lever 24 whereby the sleeve valve 21 may be rotated about its axis, as by means of a link 25.

The wall of sleeve valve 21 opposite complementary intake scroll 16 is pierced by rectangular slots 26 adapted to register with corresponding slots 26' of substantially equal size and shape in the housing extension 15.

Similarly, the wall of sleeve valve 21 opposite the opposition intake scroll 17 is pierced by rectangular slots 27 adapted to register with corresponding slots 27' of substantially equal size and shape in housing extension 15. However, slots 27 in sleeve valve 21 are staggered or displaced angularly from slots 26, the latter lying diagonally between slots 27, as is best seen in Fig. 1. Consequently, when sleeve valve 21 is adjusted so that the complementary intake scroll slots 26 are fully closed, as shown in Fig. 3, the opposition intake scroll slots 27 are in registry with slots 27' and are fully open, and vice versa.

As shown in Fig. 2, the longitudinal edges of slots 27, 27' are inclined in the direction of movement of the fluid in opposition intake scroll 17, so that when the slots are in registry this inclination of their edges maintains and aids in imparting the desired clockwise swirl, as seen in Fig. 2. Likewise, as shown in Fig. 3, the longitudinal edges of the slots 26, 26' are inclined in the direction of movement of the fluid in complementary scroll 16, for the same purpose. Slots 26 and 27 may be of a shape other than rectangular, such as curved or of spiral shape, so as to gradually open and close with respect to the rectangular slots 26' and 27'.

In operation, and assuming that the engine is operating at low altitude where decreased or low pressure rise ratio is required, sleeve valve 21 is so positioned that slots 26 and 26' are in registry and complementary intake scroll 16 is in operation, with slots 27 and 27' of opposition intake scroll 17 closed so that it is inoperative. Under these conditions of operation, the complementary intake scroll 16 imparts an initial swirl to the intake fluid in the same direction as the impeller 13 drives the fluid, so that the impeller does less work and hence the pressure rise ratio is low.

For higher altitudes, where high pressure rise ratio is required, the sleeve valve 21 is rotated so that its slots 27 are in registry with slots 27', so that opposition intake scroll 17 is in communication with the interior of supercharger extension 15, while slots 26 and 26' are closed and complementary intake scroll 16 is inoperative. Under these conditions, the initial swirl of the intake fluid entering the supercharger impeller 13 is opposite in direction to the rotation of the impeller 13, resulting in increase in impeller work and causing increase in the pressure rise ratio.

Rotation of the sleeve valve 21 may be effected manually by a handle connected to the link 25 whereby the position of lever 24 may be adjusted to one or the other of the extreme positions to render one or the other intake scroll 16 or 17 operative and the other inoperative. With this arrangement, intermediate positions of the sleeve valve 21 may be selected, so that one or the other of the scrolls 16 or 17 admits the predominant volume of air, with the other so that the impeller 13 is aided or opposed to any desired degree. In this way the pressure rise ratio may be varied from the minimum at sea level to the maximum at the ceiling of the engine.

Automatic control may be obtained in accordance with changes in altitude, so that the pressure rise ratio is increased progressively with increase in altitude. One way of effecting automatic control is illustrated diagrammatically in Fig. 4, where the sleeve valve rotating lever 24 is actuated by a piston and valve combination 28, the piston rod 29 being connected to link 25. A conventional four-way valve 30 supplies fluid under pressure, such as oil from the engine oil pump connected to pipe 31, selectively to opposite sides of piston 32 through pipes 33 and 34, pipe 35 being the discharge.

Figure 4:
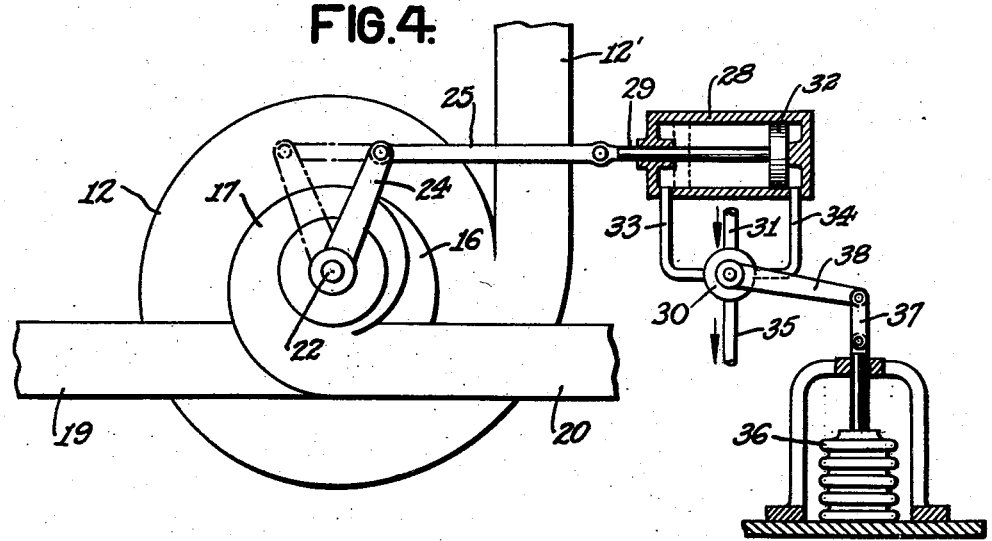
Fig. 4 is a partially schematic elevation of the supercharger arranged for automatic pressure rise ratio control in accordance with altitude changes.

Valve 30 is controlled by a gas-filled flexible bellows 36 connected thereto by link 37 and lever 38. In the position of lever 24 as shown in Fig. 4, complementary intake scroll 16 is in operation, and opposition intake scroll 17 is inoperative, with pressure oil supplied through valve 30 from pipe 31 to pipe 33. As the airplane ascends, the decrease in atmospheric pressure permits the gas in the bellows 36 to expand so that the bellows extends upwardly gradually supplying oil through pipe 34 to the opposite side of piston 32 and bleeding off oil through pipe 33.

Accordingly, as the altitude increases, sleeve valve 21 is proportionately rotated to gradually close slots 26 and open slots 27, thereby increasing the pressure rise ratio of the supercharger, until, at the fully open position of sleeve valve 21, the greatest impeller work and consequent highest pressure rise ratio is effected. Upon decrease in altitude, the reverse operation takes place.

Various other automatic controls for the sleeve valve 21 may be obtained, such as those depending upon engine speed, manifold pressure, combinations thereof, with or without altitude compensation, it being only necessary to substitute for the aneroid control 36 the desired regulator for controlling the servo-motor arrangement 28—35. Examples of such alternative servo-motor controls are disclosed in said Gregory Patent No. 2,187,737.

Figure 5:
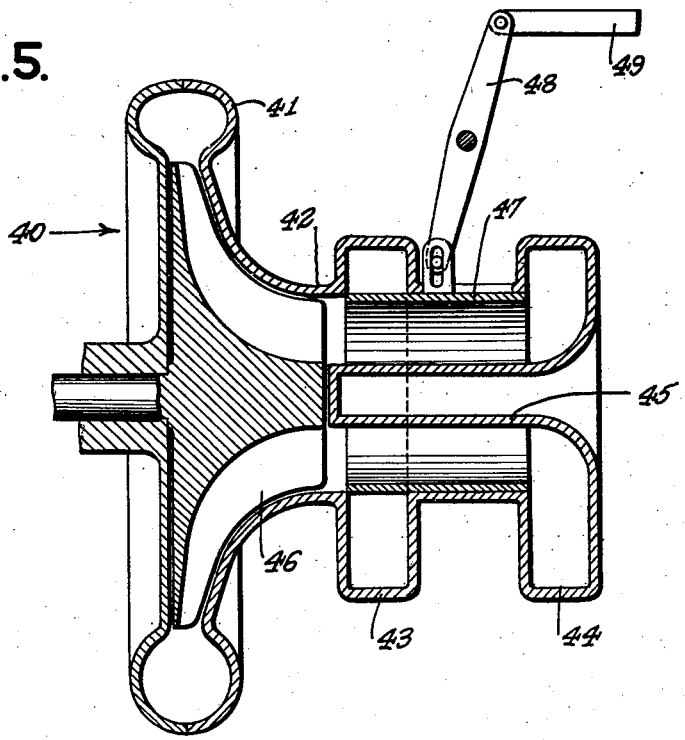
Fig. 5 is a view in section showing supercharger provided with a modified form of control valve.

Fig. 5 illustrates a modified type of control valve mechanism. In this form of the invention, the supercharger 40 has a housing 41 provided with a tubular axial extension 42 with which the scrolls 43 and 44 communicate. The scrolls are arranged similarly to the scrolls 16 and 17 described above so that opposed swirls will be created in the extension 42. The extension 41 has a coaxial hollow extension 45 projecting inwardly and terminating adjacent to the intake end of the impeller 46.

Within the extension 42 is a tubular sleeve valve 47 for regulating the amount of air or air and fuel delivered by the scrolls 43 and 44 into the extension. The sleeve valve 47 may be adjusted axially by means of a pivoted lever 48 connected to the sleeve valve and a link 49 actuated manually or automatically as described above.

Figure 6:
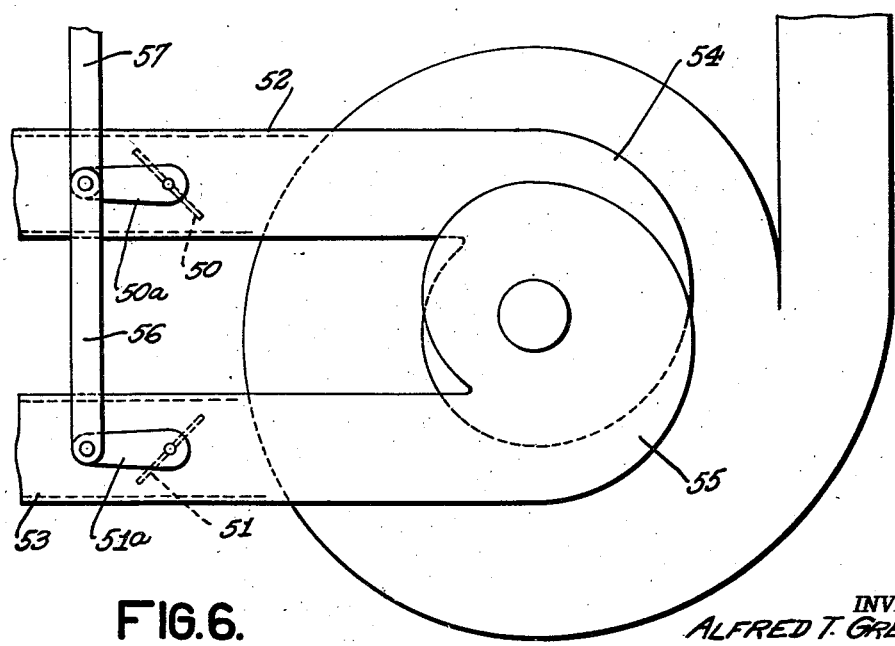
Fig. 6 is an end view of a supercharger provided with still another type of control valve system.

Another type of valve system for controlling flow from the scrolls to the supercharger is illustrated in Fig. 6. In this modification, butterfly valves 50 and 51 are arranged in the intake ducts 52 and 53 of the scrolls 54 and 55. The levers 50a and 51a on the butterfly valves are connected by a link 56 which causes one valve 50 or 51 to close when the other is opened. Any desired flow of fluid through the scrolls 52 and 53 may be obtained by adjusting the valves 50 and 51 to intermediate positions. Adjustment of the valves may be accomplished by means of a link 57 connected to the lever 50a and actuated manually or automatically as previously described.

Although preferred embodiments of the invention have been illustrated and described herein, it is to be understood that the invention is not limited thereby but is susceptible of changes in form and detail within the scope of the appended claims.

We claim:

1. In a supercharger having a rotary impeller in a casing having an axial extension forming an intake, the combination of a source of supply of the fluid to be compressed, a substantially tangential inlet scroll on said extension and interposed between said source and said intake and directed oppositely to the direction of rotation of the impeller, whereby the initial swirl imparted to the intake fluid is reversed by the impeller, a second source of fluid supply, a substantially tangential inlet scroll on said extension adjacent to the first-mentioned scroll and interposed between said second source and supercharger and directed in the direction of rotation of the impeller.

2. In a supercharger having a rotary impeller in a casing having an axial intake, the combination of a source of supply of the fluid to be compressed, a substantially tangential inlet scroll interposed between said source and said intake and directed oppositely to the direction of rotation of the impeller, a second source of fluid supply leading to said impeller intake, a substantially tangential inlet scroll interposed between said second source and said inlet and directed in the direction of rotation of the impeller, said scrolls being disposed in side by side relationship and substantially coaxial with said intake, and means interposed between said sources and said intake for selectively controlling the supply of fluid from said sources to said intake, whereby the direction of movement of the intake fluid relatively to the direction of the impeller may be regulated.

3. In a supercharger having a rotary impeller in a casing having an axial extension forming an intake, the combination of a source of supply of the fluid to be compressed, a first substantially tangential inlet scroll interposed between said source and said intake and directed oppositely to the direction of rotation of the impeller, a second source of fluid supply leading to said impeller intake, a second substantially tangential inlet scroll coaxial with and adjacent to said first scroll interposed between said second source and said inlet and directed in the direction of rotation of the impeller, and valve means interposed between each of said sources and said intake for controlling the supply of fluid from each source to said intake.

4. In a supercharger having a rotary impeller in a casing having an axial intake, the combination of a source of supply of the fluid to be compressed, a first substantially tangential inlet scroll coaxial with said intake interposed between said source and said intake and directed oppositely to the direction of rotation of the impeller, a second source of fluid supply leading to said impeller intake, a second substantially tangential inlet scroll coaxial with said intake and adjacent to said first scroll and interposed between said second source and said inlet and directed in the direction of rotation of the impeller, and valve means interposed between said sources and said intake for diverting the supply of fluid from one to the other of said sources.

5. In a supercharger having a rotary impeller in a casing having an axial intake, the combination of a source of supply of the fluid to be compressed, a substantially tangential inlet scroll interposed between said source and said intake and directed oppositely to the direction of rotation of the impeller, a second source of fluid supply leading to said impeller intake, a separate substantially tangential inlet scroll interposed between said second source and said inlet and directed in the direction of rotation of the impeller, variable valve means between said first scroll and said intake, variable valve means between said second scroll and said intake, one of said valve means being normally open and the other being normally closed, and operating means for said valve means, whereby the supply from said scrolls to said intake may be regulated.

6. In a supercharger having a rotary impeller in a casing having an axial intake, the combination of a source of supply of the fluid to be compressed, a substantially tangential inlet scroll interposed between said source and said intake and directed oppositely to the direction of rotation of the impeller, a second source of fluid supply leading to said impeller intake, a separate substantially tangential inlet scroll interposed between said second source and said inlet and directed in the direction of rotation of the impeller, variable valve means between said first scroll and said intake, variable valve means between said second scroll and said intake, one of said valve means being normally open and the other being normally closed, and common operating means for both of said valve means, whereby one of said valve means is moved toward open position while the other is moved toward closed position, and vice versa.

7. In a supercharger, the combination of a casing, a rotary impeller therein, a cylindrical extension arranged axially of the impeller forming a fluid intake, a pair of reversely curved intake scrolls on said extension separately communicating with said intake, a sleeve valve in said extension between said scrolls and intake and having separate inlet ports for the scrolls, the inlet ports being displaced, whereby one port is moved toward closed position when the other is moved toward open position to respectively decrease and increase the supply of fluid from the pair of corresponding scrolls, and means for actuating said sleeve valve to selectively vary the supply of fluid from said scrolls.

8. In a supercharger having a rotary impeller in a casing having an axial intake, the combination of a hollow extension on said casing in alignment with said intake, a pair of scrolls in side by side relationship on said extension and communicating with said intake, one of said scrolls being directed oppositely to the direction of rotation of said impeller and the other scroll being directed in the direction of rotation of said impeller, and valve means for regulating the flow of air through said scrolls.

EUGENE W. WASIELEWSKI.
ALFRED T. GREGORY.